United States Patent
Zhang et al.

(10) Patent No.: US 9,283,721 B2
(45) Date of Patent: Mar. 15, 2016

(54) PORE-FREE TIRE SEGMENTED MOLD PATTERN BLOCK, SEGMENTED MOLD, AND CLEANING METHODS THEREFOR

(75) Inventors: Wei Zhang, GaoMi (CN); Ren Zhang, GaoMi (CN)

(73) Assignee: Himile Mechanical Science and Technology (Shandong) Co., Ltd., Shandong (CN)

( * ) Notice: Subject to any disclaimer, the term of this patent is extended or adjusted under 35 U.S.C. 154(b) by 0 days.

(21) Appl. No.: 14/386,713

(22) PCT Filed: Mar. 21, 2012

(86) PCT No.: PCT/CN2012/072718
§ 371 (c)(1),
(2), (4) Date: Sep. 19, 2014

(87) PCT Pub. No.: WO2013/139007
PCT Pub. Date: Sep. 26, 2013

(65) Prior Publication Data
US 2015/0086664 A1    Mar. 26, 2015

(51) Int. Cl.
*B29C 33/10* (2006.01)
*B29C 33/72* (2006.01)
*B29D 30/06* (2006.01)

(52) U.S. Cl.
CPC ............ *B29D 30/0606* (2013.01); *B29C 33/10* (2013.01); *B29C 33/72* (2013.01); *B29D 30/0662* (2013.01); *B29D 2030/0607* (2013.01); *B29D 2030/0609* (2013.01); *B29D 2030/0617* (2013.01); *B29D 2030/0663* (2013.01)

(58) Field of Classification Search
CPC .................. B29D 30/0606; B29D 2030/0609; B29D 2030/0617; B29D 2030/0663; B29C 33/10; B29C 33/72
See application file for complete search history.

(56) References Cited

U.S. PATENT DOCUMENTS 2,297,017 A * 9/1942 Overman .................. 425/46
8,021,136 B2 * 9/2011 Lahr et al. ................. 425/46

FOREIGN PATENT DOCUMENTS

| CN | 101279488 A | 10/2008 |
|----|-------------|---------|
| CN | 201544373 U | 8/2010 |
| CN | 201544373 | 8/2011 |
| CN | 102205660 | 10/2011 |
| CN | 102601897 | 7/2012 |
| CN | 202480281 | 10/2012 |

(Continued)

OTHER PUBLICATIONS

State Intellectual Property Office of the P.R. China, International Search Report issued in International Application No. PCT/CN2012/072718, Jan. 3, 2013, 7 pages.

(Continued)

*Primary Examiner* — James Mackey
(74) *Attorney, Agent, or Firm* — Fitch, Even, Tabin & Flannery LLP (57) ABSTRACT

A pore-free tire segmented mold pattern block (100) and a segmented mold are provided. The pore-free tire segmented mold pattern block (100) is used for forming a tire segmented mold. Also disclosed is a cleaning method for the pore-free tire segmented mold pattern block (100) and the segmented mold. When the mold is cleaned, the exhaust channel (20) is used as a cleaning channel, and the axial exhaust holes (27) of the exhaust channel are used as an entrance for a cleaning medium.

15 Claims, 5 Drawing Sheets

(56) References Cited

FOREIGN PATENT DOCUMENTS

| | | | |
|---|---|---|---|
| CN | 202480281 U | | 10/2012 |
| EP | 2399730 | * | 12/2011 |
| JP | 02-295706 | * | 12/1990 |
| JP | 2001-232641 | | 8/2001 |
| JP | 2003-245928 | | 9/2003 |
| JP | 2006-103035 | | 4/2006 |
| JP | 2006-192868 | | 7/2006 |
| JP | 2007-118460 | | 5/2007 |
| JP | 2010201885 | | 9/2010 |

OTHER PUBLICATIONS

Japan Patent Office, Office Action issued in Japanese Application No. 2015-500736; Oct. 6, 2015; 3 pp.

The State Intellectual Property Office of China, First Notification of Office Action and Search Report issued in Application No. 201210076364.9, Oct. 9, 2013, 13 pp.

Korean Patent Office; Office Action issued in Korean Application No. Sep. 5, 2015-075454366; Oct. 30, 2015; 5 pp.

* cited by examiner

PORE-FREE TIRE SEGMENTED MOLD PATTERN BLOCK, SEGMENTED MOLD, AND CLEANING METHODS THEREFOR

CROSS-REFERENCE TO RELATED APPLICATIONS

This application is a U.S. national phase application filed under 35 U.S.C. §371 of International Application PCT/CN2012/072718, filed Mar. 21, 2012, designating the United States, which is incorporated herein by reference in its entirety.

FIELD OF THE INVENTION

The present invention relates to a tire mold, and particularly, to a pore-free tire segmented mold pattern block, a segmented mold and cleaning methods therefor applied in the field of tire segmented mold.

BACKGROUND OF THE INVENTION

In the current tire vulcanization process, in order that the air in the mold cavity is released and the rubber could be uniformly distributed in the mold, the existing tire molds each has a plurality of exhaust holes on the mold cavity. The required exhaust holes are usually formed through drilling. However, the burrs of the holes need to be trimmed after the drilling process, which increases the mold manufacturing process and the mold manufacturing cost. On the other hand, in the vulcanization process, the exhaust gas in the tread region is discharged through circular exhaust holes usually located at the top of the inner tube of the mold and penetrating to the outer surface of the mold. Under the conditions of high temperature and high pressure, the unvulcanized raw rubber is extruded outside the top cavity of the mold. When the air is discharged from the mold, the rubber is extruded into the drilled exhaust holes to form rubber furs, some of which may be broken in the exhaust holes of the mold and hinder the air discharge from the cavity, thus the rubber cannot fully fill the entire mold cavity. In order to avoid this, the tire molds shall be removed from the production line for a cleaning. The common cleaning operation is to compel the rubber out of each pore with a drill bit, which consumes a lot of time and affects the production efficiency. Most of the rubber furs stand on the tire after demolding, and in order to remove the rubber furs, special persons and corresponding devices have to be required to trim the rubber furs, which not only affects the appearance quality of the tire, but also wastes the rubber material and increases the production cost.

In order to overcome the above defects, a pore-free technique for the tire segmented mold is proposed, such as the U.S. patent No. US20070009623, which mounts a mass of relatively thin annular plates side by side in the housing of two opposite half molds or a segmented mold, and forms gaps on one side or two sides of the ply. When the tire is vulcanized, gas is discharged via the gaps to ensure that the vulcanized tire has a smooth surface. However, the mold structure of US20070009623 has no a circumferential exhaust slot and its exhaust gas is discharged to the back of the pattern block through the radial exhaust slot. Thus the distance is long, the exhaust effect is poor, and a blocking easily occurs. Once a blocking occurs, it is difficult for cleaning as the distance is too long. In addition, the back of the pattern block fits the sliding block, and a lot of exhaust slots shall be machined on the fitting surface to guide air, which increases the machining cost.

In addition, there are many types of tire patterns, and being restricted by the professional requirements such as pitch and steel sheet embedding, most of the molds of pore-free structures divided transversely cannot be disassembled. In addition, the mold structure of US20070009623 is open around and cannot be blocked. Thus, if the mold structure cannot be disassembled, it cannot be cleaned once being blocked.

In conclusion, although the tire vulcanized with the existing pore-free technique has a good appearance and saves the rubber material, there are still significant technical difficulties that hinder the promotion and popularization of the pore-free technique, i.e., the exhaust effect of the pore-free mold is poor and the cleaning is difficult. Almost all of the pore-free molds have a complex cleaning process and a high cost, and mostly cannot be cleaned completely, thereby directly affecting the quality and cycle of the re-vulcanization of the mold.

SUMMARY OF THE INVENTION

The problem to be solved by the present invention is to provide a pore-free tire segmented mold pattern block, a segmented mold and cleaning methods therefor, which are used to improve or overcome one or more defects of the existing pore-free mold.

The technical solutions of the present invention include:

A pore-free tire segmented mold pattern block for forming a tire segmented mold, wherein the pattern block comprises pattern pieces that are stacked one on top the other, the pattern block has an exhaust channel communicated with an inner circumference surface of each pattern piece and an end surface of the pattern block, the exhaust channel comprises axial exhaust holes that are axially disposed on the pattern block, communicate each pattern piece, and are communicated with the end surface of the pattern block, wherein when the mold is cleaned, the exhaust channel is used as a cleaning channel, and the axial exhaust holes of the exhaust channel are used as an entrance for a cleaning medium.

The present invention further proposes a pore-free tire segmented mold, comprising a plurality of the pattern blocks as above, the exhaust channel is communicated with the interior and the exterior of the mold; the axial exhaust holes of the exhaust channel are axially disposed on the pattern block, communicate each pattern piece, and are communicated with the exterior of the mold; and when the mold is cleaned, the exhaust channel is used as a cleaning channel.

According to the above structure, the present invention further proposes a cleaning method for the pore-free tire segmented mold, wherein the mold takes the exhaust channel in the pattern block as the cleaning channel, and the axial exhaust holes of the exhaust channel as an entrance for a cleaning medium.

The present invention has the following characteristics and advantages: when vulcanization is performed with the pore-free mold of the present invention, the gas between the mold and the tread enters the circumferential exhaust slot between the pattern pieces through the exhaust gap of the mold under the inner pressure of the capsule, converges in the circumferential exhaust slot, then enters the radial exhaust slot, and enters the axial exhaust holes through the radial exhaust slot, thus being discharged outside the mold.

As compared with the prior art, the mold of the present invention includes a circumferential exhaust slot with a short exhaust distance, the effect is good, the blocking does not easily occur, and the cleaning is convenient. Since the circumferential exhaust slot is communicated with the axial exhaust holes at the end surface and is directly communicated with the outside, an exhaust slot no longer needs to be machined on the fitting surface.

When the pore-free mold of the present invention is to be cleaned, firstly the axial exhaust holes on the end surface of the mold are blocked, to make the mold cavity as an approximately sealed container. Next, an organic solution is injected into the mold cavity through one of the cleaning holes on the end surface. Under the effect of a certain pressure, the organic solution is discharged through the exhaust gap, and the discharge process is the cleaning process of the exhaust gap. As compared with other method, this cleaning method removes glue scale more thoroughly and effectively, the operation is easy, and the cleaning cost is low. Therefore, the present invention makes major breakthroughs in either the machining cost or the cleaning cost.

DETAILED DESCRIPTION OF THE PREFERRED EMBODIMENTS

Firstly, the present invention proposes a pore-free tire segmented mold pattern block for forming a tire segmented mold, wherein the pattern block comprises pattern pieces that are stacked one on top the other, the pattern block has an exhaust channel communicated with an inner circumference surface of each pattern piece and an end surface of the pattern block, the exhaust channel comprises axial exhaust holes that are axially disposed on the pattern block, communicate each pattern piece, and are communicated with the end surface of the pattern block. After the segmented mold is formed with the pattern block of such structure, when a vulcanization is performed with the pore-free mold, gas between the mold and the tread enters the circumferential exhaust slot between the pattern pieces through the exhaust gap of the mold under the inner pressure of the capsule, converges in the circumferential exhaust slot, then enters the radial exhaust slot, and enters the axial exhaust holes through the radial exhaust slot, thus being discharged outside the mold.

After the segmented mold is formed with the pattern block, when a vulcanization is performed with the pore-free mold, the gas between the mold and the tread enters the circumferential exhaust slot between the pattern pieces through the exhaust gap of the mold under the inner pressure of the capsule, converges in the circumferential exhaust slot, then enters the radial exhaust slot, and enters the axial exhaust holes through the radial exhaust slot, thus being discharged outside the mold.

The present invention further proposes a pore-free tire segmented mold, comprising a plurality of pattern blocks of the above structure, the exhaust channel is communicated with the interior and the exterior of the mold, the axial exhaust holes of the exhaust channel are axially disposed on the pattern block, communicate each pattern piece, and are communicated with the exterior of the mold, wherein when the mold is cleaned, the exhaust channel is used as a cleaning channel.

In conclusion, since the pore-free tire segmented mold has the above structure, the mold can take the exhaust channel in the pattern block as the cleaning channel, and the axial exhaust holes of the exhaust channel as an entrance for a cleaning medium. The cleaning medium may be a liquid or gaseous cleaning medium.

Next, the examples of the pore-free tire segmented mold pattern block, the segmented mold and the cleaning method are further described in details with reference to the drawings and the embodiments.

Figure 1:
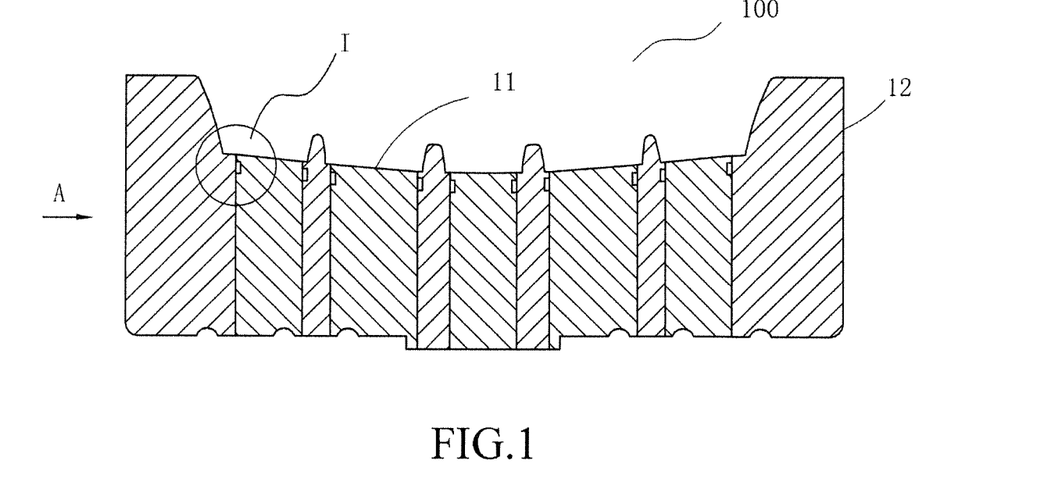
FIG. 1 is a circumferential section diagram of an embodiment of a pore-free tire segmented mold pattern block of the present invention.
Figure 2:
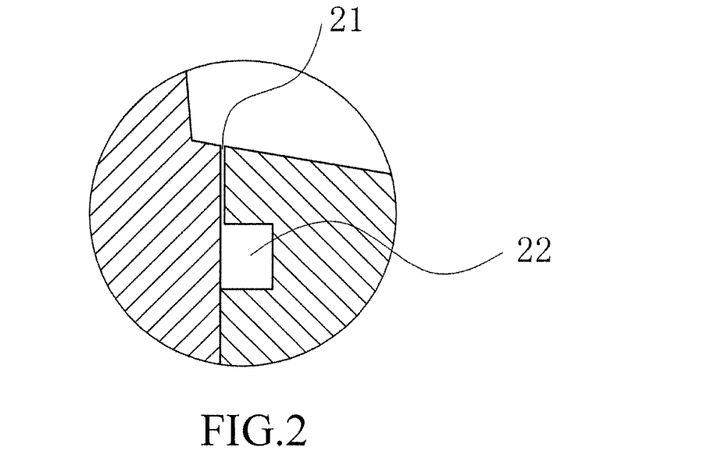
FIG. 2 is a partial enlarged diagram of portion I in FIG. 1.
Figure 5:
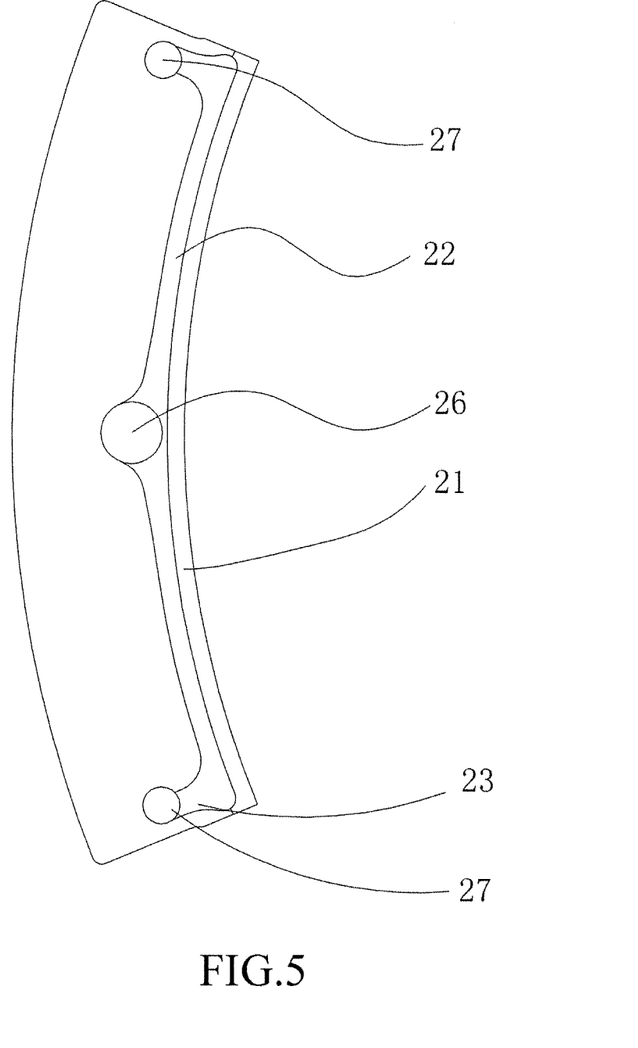
FIG. 5 is a structure diagram of a pattern piece of a pore-free tire segmented mold pattern block of the present invention.
Figure 6:
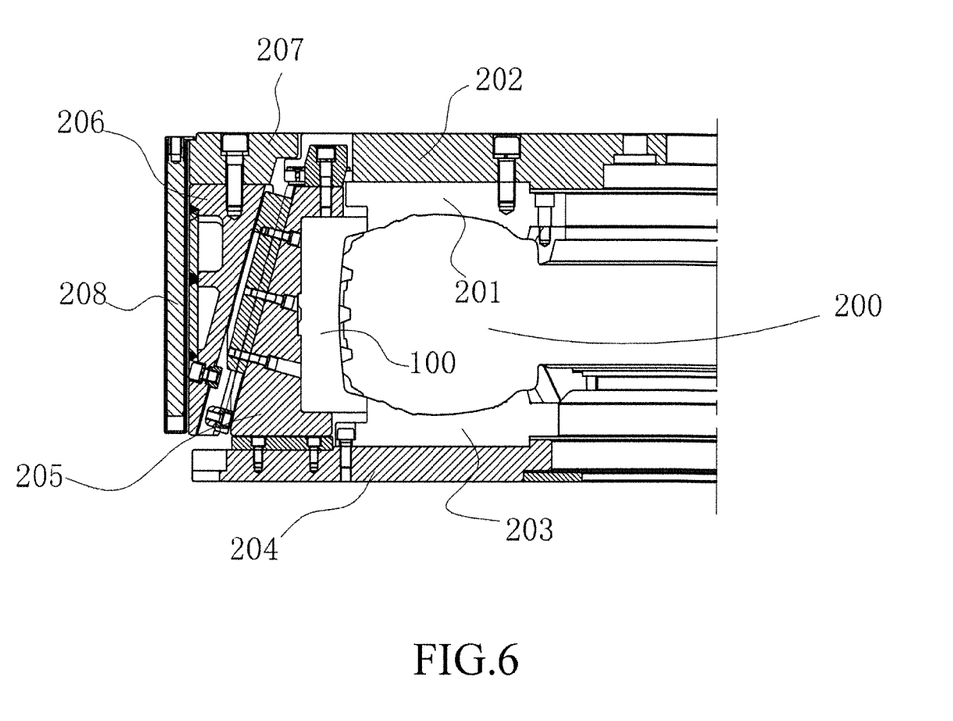
FIG. 6 is a structure diagram of a pore-free tire segmented mold assembled with a pattern block of the previous embodiment of the present invention.

As illustrated in FIGS. 1 and 2, which are structure diagrams of an embodiment of a pore-free tire segmented mold pattern block of the present invention, and a segmented mold is formed by a plurality of pattern blocks combined in a circumferential direction, wherein the pattern block 100 is formed by pattern pieces 1 that are stacked one on top the other with their inner diameters not completely the same as each other, so that the inner circumference surface of the combined pattern block 100 is consistent with the tire in shapes, and a mold pattern corresponding to the tire pattern is formed. As illustrated in FIG. 5, the pattern block 100 has an exhaust channel 20 communicated with an inner circumference surface 11 of each pattern piece 1 and an end surface 12 of the pattern block. The exhaust channel 20 comprises an exhaust gap 21, a circumferential exhaust slot 22, radial exhaust slots 23 and axial exhaust holes 27 axially disposed on the pattern block. The exhaust gap 21 is located between two adjacent pattern pieces 1, and communicated with the inner circumference surface of the pattern block 100, with a depth preferably enabling the air in a mold cavity 200 (as illustrated in FIG. 6) in the vulcanization process to be discharged while the rubber does not flow out. The circumferential exhaust slot is circumferentially extended and formed between two adjacent pattern pieces, and located outside the exhaust gap. The radial exhaust slots are communicated with the circumferential exhaust slot and the axial exhaust hole. The axial exhaust holes 27 are communicated with the radial exhaust slots 23 of each pattern piece 1, and also communicated with the end surface 12 of the pattern block 100, thereby discharging the air in the mold cavity. To be noted, the exhaust channel herein is just illustrated for the convenience of understanding, and shall not be construed as a limitation to the present invention, i.e., the exhaust channel may be of other form and structure. For example, the radial exhaust slots 23 may be set or not set upon demand. For example, when the setting ranges of the exhaust gap and the circumferential exhaust slot are wide, the axial exhaust holes can be directly connected with the circumferential exhaust slot.

Figure 3:
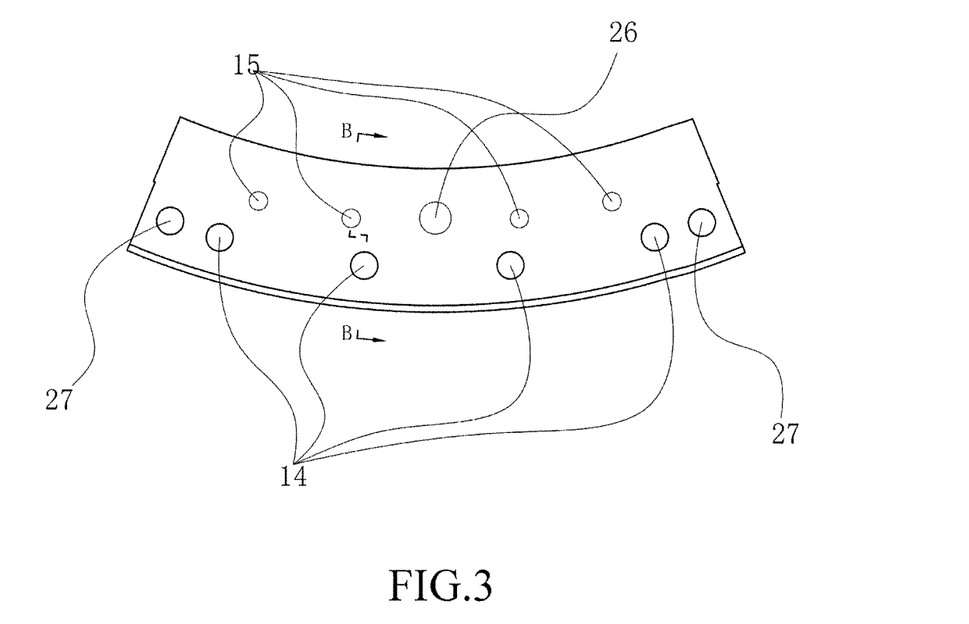
FIG. 3 is an A-direction view of FIG. 1.
Figure 4:
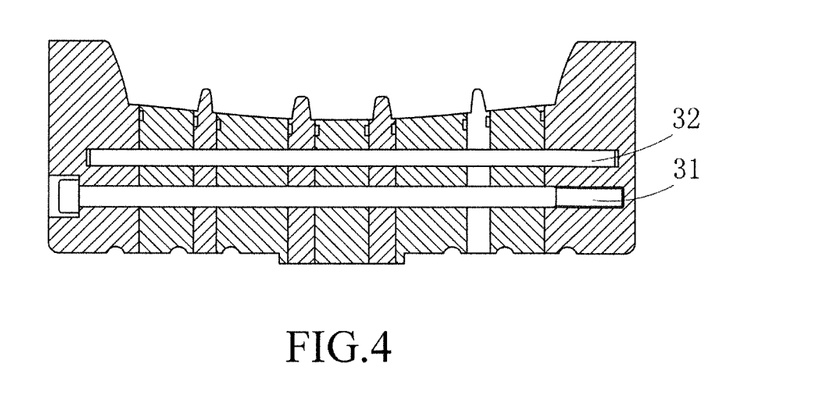
FIG. 4 is a section view taken along B-B in FIG. 3.

As illustrated in FIGS. 3 and 4, each pattern piece 1 is formed with two or more fastening screw holes 14, so that fastening screws 31 can be placed and fixed after stacking. Meanwhile, in order to ensure the circumferential positioning, locating pin holes 15 are opened along the axial direction on each pattern piece 1 so that locating pins can be inserted therethrough. By using the fastening screws 31 and the locating pins 32, respective pattern pieces 1 are stacked one on top the other in sequence to form the pattern block. This embodiment provides four fastening screw holes 14 and four locating pin holes 15, wherein the circle centers of respective fastening screw holes are located at a relatively outer concentric circle, and the circle centers of respective locating pin holes 15 are located at a relatively inner concentric circle. But the present invention is not limited thereto, and the forms, numbers and positions of the fastening screw holes 14 and the locating pin holes 15 may be changed or adjusted upon demand, which are omitted herein.

Again referring to FIG. 3, the pattern block 100 of this embodiment is provided with three axial exhaust holes, including a central axial exhaust hole 26 located at the center of the pattern block, and two lateral axial exhaust holes 27 close to the two lateral cross-sections of the pattern block 100. Both ends of each axial exhaust hole may be removablely blocked with plugs. The lateral axial exhaust holes 27 of the pore-free mold are under an open state for discharging gas in the vulcanization process of the mold, while under a closed state in the cleaning process of the mold. The central axial exhaust hole 26 of the pore-free mold is opened in the vulcanization process to present an exhaust state, while an organic solution for cleaning is injected through the hole in the cleaning process. To be noted, a person skilled in the art may appropriately adjust the form, number and position of the axial exhaust holes upon the actual demand, which are omitted herein.

FIG. 6 is a structure diagram of a pore-free tire segmented mold assembled with a pattern block of the previous embodiment of the present invention, wherein the reference numeral 100 denotes a pore-free mold (pattern block). As illustrated in FIG. 6, an upper tire side plate 201 and an upper cover 202 form an upper tire side component, a lower tire side plate 203 and a base 204 form a lower tire side component, the pattern block 100 and a sliding block 205 form a pattern component, and a guiding ring 206, a mounting ring 207 and a lagging 208 form a mold sleeve component. The mold sleeve component is connected with the vulcanization set through the mounting ring 207 to apply a force on the whole mold, thereby achieving the segmented motions of free opening and closing of the mold under the effect of the force.

The pore-free segmented mold formed using the above pattern block may perform a reverse cleaning with the exhaust channel of each pattern block. When the pore-free mold is cleaned, the lateral axial exhaust holes 27 of the mold close to the two lateral cross-sections of the pattern block 100 are blocked at first to make the mold cavity 200 as an approximately sealed container. Next, the cleaning medium (e.g., organic solution) is injected into the mold cavity 200 through one of the lateral cleaning holes 27 close to the lateral cross-sections (or the central exhaust holes 26). Under the effect of a certain pressure (preferably 5-50 Mpa), the cleaning medium is discharged through the exhaust gap 11, and in conjunction with FIG. 7, the discharge process is a cleaning process of the exhaust gap 11. As compared with other method, this cleaning method removes glue scale more thoroughly and effectively, the operation is easy, and the cleaning cost is low.

Figure 7:
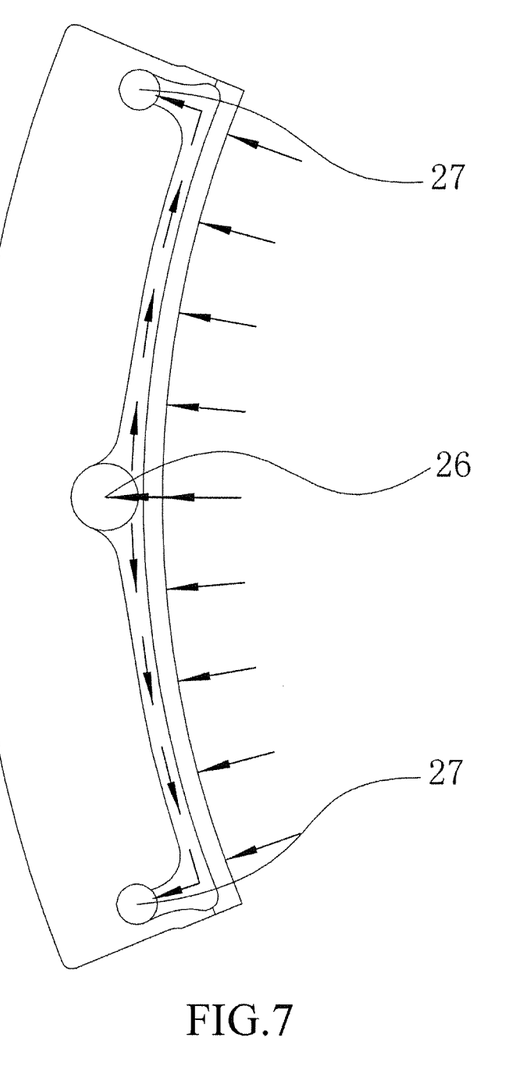
FIG. 7 is a schematic diagram which illustrates an exhaust process of the mold in the previous embodiment by taking a pattern piece as an instance, and the reverse process is a cleaning process.

In order to discharge gas more smoothly in the vulcanization process, in this embodiment, as illustrated in FIGS. 5 and 7, the circumferential exhaust slot 22 and the radial exhaust slots 23 on the pattern piece 1 have preferable smooth streamline shapes, and the joints or corners of the circumferential exhaust slot 22, the radial exhaust slots 23 and the axial exhaust holes are smooth transition structures, so that the cleaning medium is injected and passes through more smoothly in the cleaning process. To be noted, the structure parameters of related passageways are not limited, and can be determined or adjusted according to the actual conditions.

Herein the lateral axial exhaust holes are relatively closer to the outer periphery of the pattern block, and the central axial exhaust hole is relatively closer to the inner periphery of the pattern block. Preferably, respective axial exhaust holes are uniformly arranged in the circumferential direction, so as to achieve better effects of exhaust and cleaning.

Preferably, the exhaust gap 11 between adjacent pattern pieces 1 is a ring slightly concave formed by cutting at least one surface of corresponding pattern piece extending from the inner periphery to the outer periphery in a certain extent. The depth of the exhaust gap 11 may be 0.005 to 0.05 mm, preferably 0.02 to 0.035 mm, and the width of extending from the inner periphery to the outer periphery is preferably 0.5 to 5 mm, or more than 5 mm.

In one preferred embodiment of the present invention, the circumferential exhaust slot has a depth of 0.5 to 3 mm, and a width of 1 to 6 mm (more than 6 mm when necessary).

The above descriptions are just preferred embodiments of the present invention, rather than formal limitations to the present invention. Although the present invention has been disclosed as above through the preferred embodiments, the present invention is not limited thereto. Any person skilled in the art can make some amendments or modifications to obtain equivalent embodiments with equal changes by using the above disclosed technical contents, without deviating from the scope of the technical solution of the present invention. Under the condition of not deviating from the scope of the technical solution of the present invention, any simple amendment, equivalent change and modification made to the above embodiments according to the technical essence of the present invention shall still fall within the scope of the technical solution of the present invention.

The invention claimed is:

1. A pore-free tire segmented mold pattern block for forming a tire segmented mold, characterized in that, the pattern block comprises pattern pieces that are stacked one on top the other, the pattern block has an exhaust channel communicated with an inner circumference surface of each pattern piece and an end surface of the pattern block, the exhaust channel comprises axial exhaust holes that are axially disposed on the pattern block, communicate each pattern piece, and are communicated with the end surface of the pattern block, wherein when the mold is cleaned, the exhaust channel is used as a cleaning channel, and the axial exhaust holes of the exhaust channel are used as an entrance for a cleaning medium.

2. The pore-free tire segmented mold pattern block according to claim 1, characterized in that, the exhaust channel further comprises an exhaust gap, a circumferential exhaust slot and radial exhaust slots; the exhaust gap is located between two adjacent pattern pieces, and communicated with the inner circumference surface of the pattern block, with a depth enabling the gas in a mold cavity in a vulcanization process to be discharged while the rubber does not flow out; the circumferential exhaust slot is circumferentially extended and formed between two adjacent pattern pieces, and located outside the exhaust gap; the radial exhaust slots communicate the circumferential exhaust slot with the axial exhaust holes.

3. The pore-free tire segmented mold pattern block according to claim 2, characterized in that, the exhaust gap is a ring formed by cutting outwards for a certain width from the inner periphery of at least one surface of the pattern piece; the exhaust gap has a depth of 0.005 to 0.05 mm, and a width of 0.5 to 5 mm or more than 5 mm.

4. The pore-free tire segmented mold pattern block according to claim 2, characterized in that, the circumferential exhaust slot has a depth of 0.5 to 3 mm, and a width of 1 to 6 mm or more than 6 mm.

5. The pore-free tire segmented mold pattern block according to claim 2, characterized in that, the circumferential exhaust slot and the radial exhaust slots on each pattern piece have streamline shapes, and joints or corners of the circumferential exhaust slot, the radial exhaust slots and the axial exhaust holes are smooth transition structures.

6. The pore-free tire segmented mold pattern block according to claim 1, characterized in that, each pattern block comprises lateral axial exhaust holes near lateral sections of the pattern block and a central axial exhaust hole.

7. The pore-free tire segmented mold pattern block according to claim 6, characterized in that, the respective axial exhaust holes are uniformly arranged in the circumferential direction, the lateral axial exhaust holes are near an outer edge of the pattern block, and the central axial exhaust hole is near the center of the pattern block.

8. The pore-free tire segmented mold pattern block according to claim 1, characterized in that, each pattern piece is formed with two or more fastening screw holes, so that fastening screws can be placed and fixed therethrough after stacking; locating pin holes are opened along the axial direction on each pattern piece, so that locating pins can be inserted therethrough; by using the fastening screws and the locating pins, the respective pattern pieces are stacked one on top the other in sequence to form the pattern block.

9. The pore-free tire segmented mold pattern block according to claim 8, characterized in that, circle centers of the respective fastening screw holes on each pattern piece are located at a first concentric circle outside of a second concentric circle, concentric with the first concentric circle, at which circle centers of the respective locating pin holes are located.

10. A pore-free tire segmented mold, comprising a plurality of pattern blocks according to claim 1, the exhaust channel is communicated with the interior and the exterior of the mold; the axial exhaust holes of the exhaust channel are axially disposed on the pattern block, communicate each pattern piece, and are communicated with the exterior of the mold; and when the mold is cleaned, the exhaust channel is used as a cleaning channel.

11. A pore-free tire segmented mold, characterized in comprising a plurality of pattern blocks according to claim 2, the exhaust channel is communicated with the interior and the exterior of the mold; the axial exhaust holes of the exhaust channel are axially disposed on the pattern block, communicate each pattern piece, and are communicated with the exterior of the mold; and when the mold is cleaned, the exhaust channel is used as a cleaning channel.

12. A cleaning method using a pore-free tire segmented mold according to claim 10, comprising: using the exhaust channel in the pattern block as the cleaning channel, and the axial exhaust holes of the exhaust channel as an entrance for a cleaning medium.

13. The cleaning method for the pore-free tire segmented mold according to claim 12, comprising: placing the axial exhaust holes under an open exhaust state during a vulcanization process; and using at least one of the axial exhaust holes as an entrance for the cleaning medium, through which a cleaning solution is injected to complete the cleaning during the cleaning method, while other axial exhaust holes are placed under a closed state.

14. The cleaning method for the pore-free tire segmented mold according to claim 12, characterized in that, the cleaning medium is a liquid or gaseous cleaning medium.

15. The cleaning method for the pore-free tire segmented mold according to claim 14, characterized in that, the liquid cleaning medium is an organic solution, with a cleaning pressure of 5 to 50 Mpa.

* * * * *